United States Patent
Conti et al.

(10) Patent No.: US 11,761,508 B2
(45) Date of Patent: Sep. 19, 2023

(54) VARIABLE-DAMPING HYDRAULIC SHOCK-ABSORBER FOR A VEHICLE SUSPENSION

(71) Applicant: MARELLI SUSPENSION SYSTEMS ITALY S.P.A., Corbetta (IT)

(72) Inventors: Piero Antonio Conti, Asti (IT); Fabio Cotto, Turin (IT); Marco Di Vittorio, Turin (IT); Giordano Greco, Turin (IT)

(73) Assignee: MARELLI SUSPENSION SYSTEMS ITALY S.p.A., Corbetta (IT)

( * ) Notice: Subject to any disclaimer, the term of this patent is extended or adjusted under 35 U.S.C. 154(b) by 415 days.

(21) Appl. No.: 17/263,657

(22) PCT Filed: Jul. 26, 2019

(86) PCT No.: PCT/IB2019/056386
§ 371 (c)(1),
(2) Date: Jan. 27, 2021

(87) PCT Pub. No.: WO2020/021500
PCT Pub. Date: Jan. 30, 2020

(65) Prior Publication Data
US 2021/0310535 A1    Oct. 7, 2021

(30) Foreign Application Priority Data
Jul. 27, 2018  (IT) .................. 102018000007584

(51) Int. Cl.
*F16F 9/18*       (2006.01)
*F16F 9/516*      (2006.01)
(Continued)

(52) U.S. Cl.
CPC ............... *F16F 9/185* (2013.01); *F16F 9/34* (2013.01); *F16F 9/46* (2013.01); *F16F 9/516* (2013.01);
(Continued)

(58) Field of Classification Search
CPC ...... F16F 9/185; F16F 9/34; F16F 9/46; F16F 9/516; F16F 2222/12; F16F 2228/066;
(Continued)

(56) References Cited

U.S. PATENT DOCUMENTS 4,031,989 A * 6/1977 Blazquez ................... F16F 9/46
                                                188/315
4,589,528 A * 5/1986 Axthammer ............ F16F 9/466
                                                188/266.2
(Continued)

FOREIGN PATENT DOCUMENTS

DE         4007261 A1   9/1991
DE    102005053394 A1   5/2006
(Continued)

OTHER PUBLICATIONS

International Search Report and Written Opinion of the International Searching Authority for PCT International Application No. PCT/IB2019/056386 dated Oct. 28, 2019.

*Primary Examiner* — Thomas J Williams
*Assistant Examiner* — James K Hsiao
(74) *Attorney, Agent, or Firm* — Howard & Howard Attorneys PLLC

(57) ABSTRACT

A shock-absorber has a cylindrical body having an inner and an outer cylindrical tubes enclosing a reservoir chamber containing oil, and a rod. A piston divides the internal volume of the inner cylindrical tube into a rebound chamber and a compression chamber. The cylindrical body has an intermediate cylindrical tube enclosing with the inner cylindrical tube an intermediate chamber. A first electronically-controlled valve is arranged inside the inner cylindrical tube, so as to be drivingly connected to the rod, and hydraulically connected to the rebound chamber and to the compression chamber to adjust, during rebound phase, flow of the damping fluid from the rebound chamber to the compression (Continued)

chamber. A second electronically-controlled valve is arranged outside the cylindrical body and is hydraulically connected to the reservoir chamber and to the intermediate chamber to adjust, during compression phase, flow of the damping fluid from the compression chamber to the reservoir chamber via the intermediate chamber.

6 Claims, 1 Drawing Sheet

(51) Int. Cl.
  *B60G 13/08* (2006.01)
  *F16F 9/34* (2006.01)
  *F16F 9/46* (2006.01)
(52) U.S. Cl.
  CPC .......... *B60G 13/08* (2013.01); *B60G 2202/24* (2013.01); *B60G 2204/62* (2013.01); *B60G 2206/41* (2013.01); *B60G 2500/104* (2013.01); *B60G 2500/11* (2013.01); *B60G 2800/162* (2013.01); *F16F 2222/12* (2013.01); *F16F 2228/066* (2013.01); *F16F 2232/08* (2013.01); *F16F 2234/02* (2013.01)
(58) Field of Classification Search
  CPC .... F16F 2232/08; F16F 2234/02; F16F 9/463; F16F 9/464; F16F 9/5165; B60G 2204/62; B60G 13/08; B60G 2202/24; B60G 2206/41; B60G 2500/104; B60G 2500/11; B60G 2800/162
  See application file for complete search history.

(56) References Cited

U.S. PATENT DOCUMENTS

| | | | | |
|---|---|---|---|---|
| 4,993,693 | A * | 2/1991 | Lohr | B60G 17/044 267/64.17 |
| 5,222,759 | A * | 6/1993 | Wanner | F16F 9/20 280/5.515 |
| 5,293,971 | A * | 3/1994 | Kanari | F16F 9/348 188/282.1 |
| 5,375,683 | A * | 12/1994 | Huang | F16F 9/46 188/266.8 |
| 5,386,893 | A * | 2/1995 | Feigel | F16F 9/46 188/266.5 |
| 5,392,885 | A * | 2/1995 | Patzenhauer | F16F 9/46 188/266.6 |
| 5,586,627 | A * | 12/1996 | Nezu | F16F 9/46 188/266.6 |
| 5,588,510 | A * | 12/1996 | Wilke | F16F 9/465 188/315 |
| 5,593,007 | A * | 1/1997 | Siltanen | F16F 9/185 188/320 |
| 5,788,030 | A * | 8/1998 | Rottenberger | F16F 9/34 188/290 |
| 5,833,037 | A * | 11/1998 | Preukschat | F16F 9/512 188/299.1 |
| 6,371,262 | B1 * | 4/2002 | Katou | F16F 9/465 188/266.5 |
| 6,464,048 | B1 * | 10/2002 | Groves | F16F 9/465 188/315 |
| 6,926,128 | B2 * | 8/2005 | Barbison | F16F 9/50 188/315 |
| 7,950,506 | B2 * | 5/2011 | Nowaczyk | F16F 9/466 188/315 |
| 7,997,588 | B2 * | 8/2011 | Ohnuma | B60G 21/0556 280/124.16 |
| 9,062,737 | B2 * | 6/2015 | Hoult | F16F 9/26 |
| 9,228,632 | B2 * | 1/2016 | Lee | F16F 9/512 |
| 9,291,229 | B2 * | 3/2016 | Shibahara | F16F 9/18 |
| 9,399,383 | B2 * | 7/2016 | Blankenship | B60G 17/01908 |
| 10,962,080 | B2 * | 3/2021 | Bruno | F16F 9/461 |
| 11,305,604 | B2 * | 4/2022 | Woenarta | B60G 13/06 |
| 2003/0192755 | A1 * | 10/2003 | Barbison | F16F 9/185 188/315 |
| 2005/0121268 | A1 * | 6/2005 | Groves | F16F 9/464 188/266.6 |
| 2006/0108190 | A1 * | 5/2006 | Forster | F16F 9/34 188/318 |
| 2007/0017760 | A1 * | 1/2007 | Runkel | F16F 9/0209 267/64.15 |
| 2007/0084687 | A1 * | 4/2007 | Foster | F16F 9/512 188/322.2 |
| 2009/0267311 | A1 * | 10/2009 | Ohnuma | B60G 21/0556 91/422 |
| 2012/0001399 | A1 * | 1/2012 | Coombs | F16F 9/064 280/124.161 |
| 2014/0090941 | A1 * | 4/2014 | Shibahara | F16F 9/325 188/315 |
| 2015/0152935 | A1 * | 6/2015 | Ogawa | F16F 9/46 188/313 |
| 2016/0288605 | A1 * | 10/2016 | Teraoka | B60G 13/08 |
| 2017/0058988 | A1 * | 3/2017 | Manger | F16F 9/369 |
| 2018/0094691 | A1 * | 4/2018 | Zhu | B60G 13/08 |
| 2018/0340588 | A1 * | 11/2018 | Chikamatsu | F16F 9/5126 |
| 2019/0107169 | A1 * | 4/2019 | Hagidaira | F16K 27/048 |

FOREIGN PATENT DOCUMENTS

DE 102011100307 A1 11/2012
WO 2018134433 A1 7/2018

\* cited by examiner

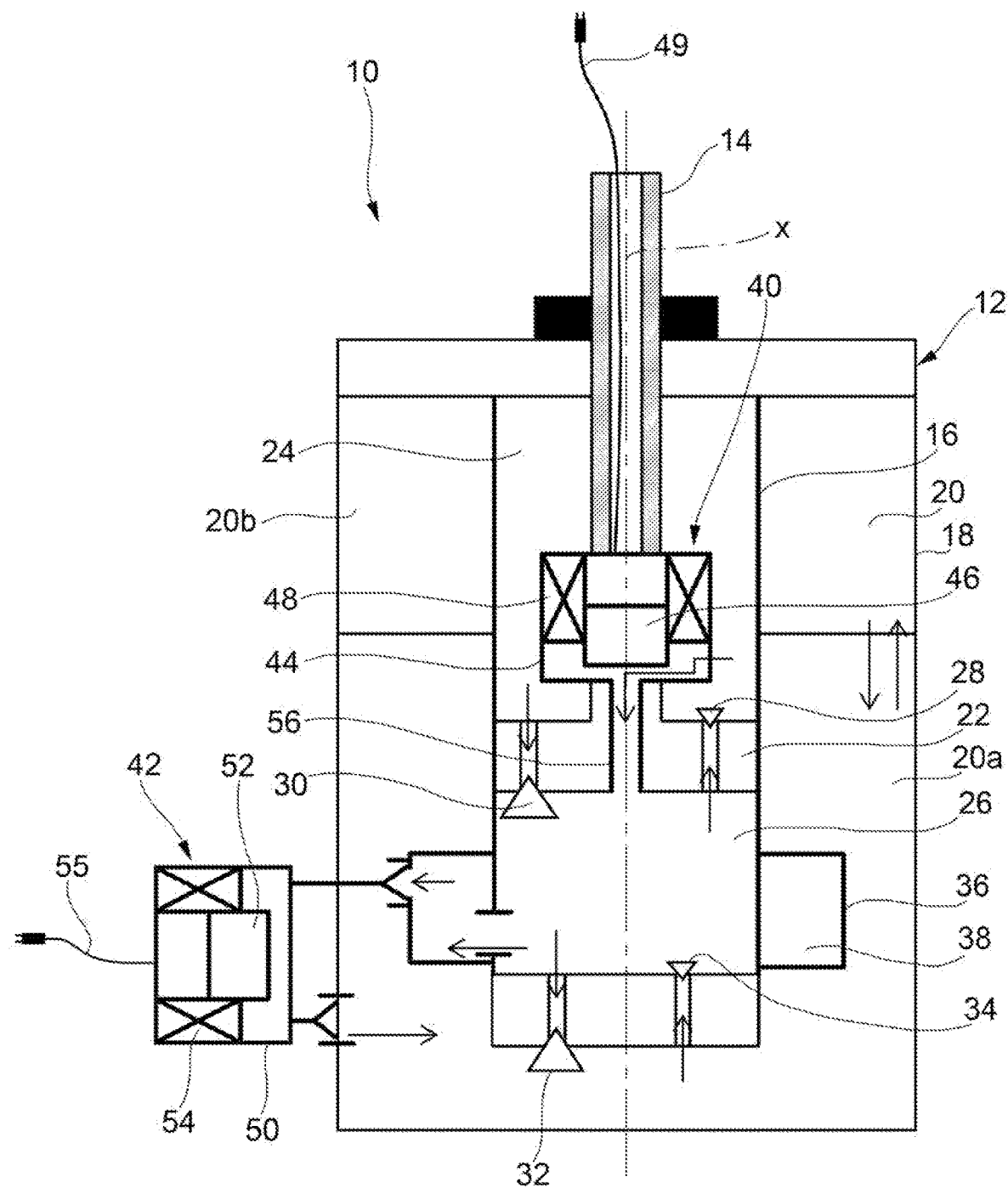

VARIABLE-DAMPING HYDRAULIC SHOCK-ABSORBER FOR A VEHICLE SUSPENSION

CROSS-REFERENCE TO RELATED APPLICATIONS

The present application is a National Stage of International Patent Application No. PCT/IB2019/056386, filed Jul. 26, 2019, which claims priority to and all the benefits of Italian Patent Application No. 102018000007584, filed on Jul. 27, 2018 both of which are hereby expressly incorporated herein by reference in its entirety.

BACKGROUND OF THE INVENTION

1. Field of Invention

The present invention relates to a variable-damping hydraulic shock-absorber, particularly for a vehicle suspension.

More specifically, the present invention relates to a variable-damping hydraulic shock-absorber comprising a pair of electronically-controlled valves, made, for example, as solenoid valves, one of which is arranged to adjust the flow of the damping fluid (typically oil) of the shock-absorber during the compression phase only, while the other is arranged to adjust the flow of the damping fluid during the rebound (or extension) phase only.

2. Description of Related Art

A shock-absorber of the above-mentioned type is known, for example, from DE 10 2005 053 394 A1.

According to the above known solution, the shock-absorber comprises an outer cylindrical tube, an inner cylindrical tube coaxial to the outer cylindrical tube and defining with the latter a reservoir chamber, a rod coaxially arranged to the two cylindrical tubes and partially protruding therefrom, and a piston slidably mounted in the inner cylindrical tube and attached to the bottom end of the rod. The piston divides the internal volume of the inner cylindrical tube into a rebound chamber and a compression chamber, which contain the damping fluid. The piston is provided with a first valve assembly comprising a pair of non-return valves, namely a compensation valve, which during the compression phase of the shock-absorber adjusts the flow of the damping fluid from the compression chamber to the rebound chamber, and a rebound valve, which during the rebound phase of the shock-absorber adjusts the flow of the damping fluid from the rebound chamber to the compression chamber. A second valve assembly is mounted on the bottom of the inner cylindrical tube and comprises a pair of non-return valves, namely a compression valve, which during the compression phase adjusts the flow of the damping fluid from the compression chamber to the reservoir chamber, and an intake valve, which during the rebound phase adjusts the flow of the damping fluid from the reservoir chamber to the compression chamber. The non-return valves of the first valve assembly and of the second valve assembly are made as passive valves.

The above known shock-absorber further comprises first and second electronically-controlled valves arranged to adjust the flow of the damping fluid during the rebound phase and during the compression phase, respectively. More specifically, the first electronically-controlled valve is connected on the one hand to the reservoir chamber and on the other hand to a first intermediate chamber defined between the inner cylindrical tube and a first intermediate cylindrical tube which is radially interposed between the inner cylindrical tube and the outer cylindrical tube, the first intermediate chamber being permanently in fluid communication with the rebound chamber. The first electronically-controlled valve is arranged to adjust, during the rebound phase, the flow of the damping fluid from the rebound chamber to the reservoir chamber via the first intermediate chamber, and to adjust the damping force of the shock-absorber during that phase. The second electronically-controlled valve is connected on the one hand to the reservoir chamber and on the other hand to a second intermediate chamber defined between the inner cylindrical tube and a second intermediate cylindrical tube which is radially interposed between the inner cylindrical tube and the outer cylindrical tube, the second intermediate chamber being permanently in fluid communication with the compression chamber. The second electronically-controlled valve is arranged to adjust, during the compression phase, the flow of the damping fluid from the compression chamber to the reservoir chamber via the second intermediate chamber, and to adjust the damping force of the shock-absorber during that phase.

The valve bodies of both the electronically-controlled valves of the above-described shock-absorber are arranged outside the outer cylindrical tube. The shock-absorber known from DE 10 2005 053 394 A1 has larger sizes than variable-damping shock-absorbers having only one electronically-controlled valve, and is therefore more difficult to mount on board of a vehicle, in particular where the available space is rather small.

Furthermore, the shock-absorber known from DE 10 2005 053 394 A1 is characterized by the presence of a non-return valve, which is placed on the bottom of the first intermediate cylindrical tube, hydraulically in parallel with the first electronically-controlled valve, and allows oil flow only in the direction from the reservoir chamber to the rebound chamber via the first intermediate chamber during the compression phase. The presence of the non-return valve makes the design of the shock-absorber very complicated, since the non-return valve does not have a standard design, i.e. a design similar to any other passive valve of the shock-absorber, but a non-standard annular configuration. Moreover, the non-return valve may be subject to jamming during its opening and closing movements. Finally, the presence of the non-return valve requires a larger diameter of the first intermediate cylindrical tube and a larger diameter of the outer cylindrical tube, which causes an increase in the radial size of the shock-absorber with respect to variable-damping hydraulic shock-absorbers having one electronically-controlled valve only.

On the other hand, the use of two electronically-controlled valves, instead of only one, allows to control the rebound phase and the compression phase of the shock-absorber independently of each other, offers a wider range of adjustment, especially during the compression phase, and also allows a better control of the "high" frequencies (approximately 15 Hz) typical of the vehicle wheels, given that the response of the shock-absorber is very fast by virtue of the possibility to set each electronically-controlled valve in advance, i.e. before the beginning of the respective phase (rebound or compression).

SUMMARY OF THE INVENTION

It is an object of the present invention to provide a variable-damping hydraulic shock-absorber which, while keeping the above-mentioned advantages related to the use of two electronically-controlled valves and having at the same time an architecture entirely based on passive valves with a standard configuration, has smaller sizes than shock-absorbers of the prior art.

This and other objects are fully achieved according to the present invention by a variable-damping hydraulic shock-absorber as described and claimed herein.

Advantageous embodiments of the present invention are also described.

In short, the present invention is based on the idea of providing the hydraulic shock-absorber with first and second electronically-controlled valves that control the flow of the damping fluid during the rebound phase only and during the compression phase only, respectively, wherein the first electronically-controlled valve is arranged inside the body of the shock-absorber, being mounted on the piston or on the rod and being drivingly connected for translation with the piston and rod assembly, while the second electronically-controlled valve is arranged outside the body of the shock-absorber.

Thanks to such a configuration, the hydraulic shock-absorber according to the present invention keeps the above-mentioned advantages of the prior art, related to the use of two electronically-controlled valves to control the flow of the damping fluid during the compression and rebound phases, and has smaller sizes than shock-absorbers of the prior art, since only one of the two electronically-controlled valves is arranged outside the body of the shock-absorber.

BRIEF DESCRIPTION OF THE DRAWINGS

Further features and advantages of the present invention will become more apparent from the following detailed description, given purely by way of non-limiting example with reference to the appended drawing, wherein FIG. 1 (the only FIGURE) is an axial section view schematically showing the architecture of a variable-damping hydraulic shock-absorber according to the present invention.

DETAILED DESCRIPTION OF THE INVENTION

With reference to FIG. 1, a variable-damping hydraulic shock-absorber (hereinafter simply referred to as shock-absorber), intended in particular for use in a vehicle suspension, is generally indicated at 10.

The shock-absorber 10 comprises a cylindrical body 12 (hereinafter simply referred to as body) extending along a longitudinal axis x and a rod 14 which partially protrudes (upwards, according to the point of view of a person looking at FIG. 1) from the body 12 and is movable axially (that is, along the direction of the longitudinal axis x) with respect to the body 12.

The body 12 comprises an inner cylindrical tube 16 and an outer cylindrical tube 18 which are arranged coaxially to each other and enclose a reservoir chamber 20 containing a damping fluid (typically oil, hereinafter simply referred to as oil) in a lower portion thereof and gas in the remaining upper portion. The upper and lower portions of the reservoir chamber are indicated at 20a and 20b, respectively.

A piston 22 is slidably mounted in the inner cylindrical tube 16 and is attached to the bottom end of the rod 14. The piston 22 divides the internal volume of the inner cylindrical tube 16 into a rebound chamber 24 and a compression chamber 26, both containing oil.

The piston 22 is provided with a first valve assembly comprising a pair of non-return valves 28 and 30, namely a compensation valve 28, which allows oil flow only in the direction from the compression chamber 26 to the rebound chamber 24, and a rebound valve 30, which allows oil flow only in the direction from the rebound chamber 24 to the compression chamber 26. A second valve assembly is mounted on the bottom of the inner cylindrical tube 16 and comprises a pair of non-return valves 32 and 34, namely a compression valve 32, which allows oil flow only in the direction from the compression chamber 26 to the reservoir chamber 20, and an intake valve 34, which allows oil flow only in the direction from the reservoir chamber 20 to the compression chamber 26. The non-return valves 28 and 30 of the first valve assembly and the non-return valves 32 and 34 of the second valve assembly are made as passive valves.

An intermediate cylindrical tube 36 is arranged around the inner cylindrical tube 16, coaxially thereto, and encloses, along with the inner cylindrical tube 16, an intermediate chamber 38. The intermediate chamber 38 is permanently in fluid communication with the compression chamber 26.

The shock-absorber 10 further comprises a first electronically-controlled valve 40 and a second electronically-controlled valve 42, hereinafter simply referred to as first and second electronic valves, respectively.

The first electronic valve 40 may be made as a two-way solenoid valve and comprises, in per-se-known manner, a valve body 44, a closure member 46 movable relative to the valve body 44 and a solenoid 48 arranged to control the movement of the closure member 46 to adjust the oil flow through either way of the valve. The solenoid 48 is supplied by an electric wire 49 extending along the longitudinal axis x through the rod 14 (which, for this purpose, is made as a hollow rod). Likewise, the second electronic valve 42 may be made as a two-way solenoid valve and comprises, in per-se-known manner, a valve body 50, a closure member 52 movable relative to the valve body 50 and a solenoid 54 arranged to control the movement of the closure member 52 to adjust the oil flow through either way of the valve. The solenoid 54 is supplied by an electric wire 55.

However, other configurations are possible for the two electronic valves 40 and 42. For example, the two electronic valves may be piloted or double-stage valves. It is, in fact, clear that the present invention is not limited to the use of a particular type of electronic valve.

The first and second electronic valves 40 and 42 may both be continuously-controlled proportional valves or ON/OFF valves. Alternatively, one of the two valves may be a continuously-controlled proportional valve and the other one an ON/OFF valve.

The first electronic valve 40 is arranged inside the body 12 of the shock-absorber. More specifically, the first electronic valve 40 is arranged inside the inner cylindrical tube 16, so as to be drivingly connected for translation along the longitudinal axis x to the assembly formed by the rod 14 and the piston 22. In the embodiment schematically shown in FIG. 1, the first electronic valve 40 is mounted on the rod 14, but may alternatively be mounted on the piston 22.

The first electronic valve 40 controls oil flow from the rebound chamber 24 to the compression chamber 26, along a bypass conduit 56 that extends through the piston 22, during the rebound phase of the shock-absorber, working in parallel to the non-return valves 28 and 30 of the first valve assembly provided on the piston 22. Therefore, the first electronic valve 40 is connected at its first way to the rebound chamber 24 and at its second way to the bypass conduit 56.

The second electronic valve 42 is arranged outside the body 12 of the shock-absorber. More specifically, the second electronic valve 42 is arranged outside the outer cylindrical tube 18.

The second electronic valve 42 controls oil flow from the compression chamber 26 to the reservoir chamber 20 (in particular to the lower portion 20a of the reservoir chamber) via the intermediate chamber 38, during the compression phase of the shock-absorber, working in parallel to the non-return valves 32 and 34 of the second valve assembly provided on the bottom of the inner cylindrical tube 16. To this end, the second electronic valve 42 is connected at its first way to the intermediate chamber 38 (and, via the intermediate chamber, to the compression chamber 26) and at its second way to the reservoir chamber 20.

The shock-absorber 10 described above operates as follows.

During the rebound phase of the shock-absorber the oil flow from the rebound chamber 24 to the compression chamber 26 takes place through the first electronic valve 40 and/or the rebound valve 30, which operate in parallel to each other, while the compensation valve 28 remains closed.

The oil flow from the reservoir chamber 20 to the compression chamber 26 takes place through the second electronic valve 42 and/or the intake valve 34, while the compression valve 32 remains closed. Advantageously, the intake valve 34 has a very soft setting, so as to determine a substantially null pressure drop between the reservoir chamber 20 and the compression chamber 26 and thus remain substantially open during the entire rebound phase. Accordingly, the entire oil flow from the reservoir chamber 20 to the compression chamber 26 passes through the intake valve 34, rather than through the second electronic valve 42 that is arranged hydraulically in parallel thereto. Therefore, the second electronic valve 42 does not have substantially any effect on the behaviour of the shock-absorber 10 during the rebound phase, irrespective of the value of the current command applied to the solenoid 54.

By suitably piloting the first electronic valve 40 it is possible to adjust the oil flow from the rebound chamber 24 to the compression chamber 26, thereby adjusting the damping force exerted on the rod 14 during the rebound phase.

During the compression phase of the shock-absorber the oil flow from the compression chamber 26 to the reservoir chamber 20 takes place through the second electronic valve 42 and/or the compression valve 32, which operate in parallel to each other, while the intake valve 34 remains closed.

The oil flow from the compression chamber 26 to the rebound chamber 24 takes place through the first electronic valve 40 and/or the compensation valve 28, while the rebound valve 30 remains closed. Advantageously, the compensation valve 28 has a very soft setting, so as to determine a substantially null pressure drop between the compression chamber 26 and the rebound chamber 24 and thus remain substantially open during the entire compression phase. Accordingly, the entire oil flow from the compression chamber 26 to the rebound chamber 24 passes through the compensation valve 28, rather than through the first electronic valve 40 that is arranged hydraulically in parallel thereto. Therefore, the first electronic valve 40 does not have substantially any effect on the behaviour of the shock-absorber 10 during the compression phase, irrespective of the value of the current command applied to the solenoid 48.

By suitably piloting the second electronic valve 42 it is possible to adjust the oil flow from the compression chamber 26 to the reservoir chamber 20 via the intermediate chamber 38, thereby adjusting the damping force exerted on the rod 14 during the compression phase.

The electronic valves 40 and 42 may be both made as non-return valves (in particular, as a valve allowing oil flow only in the direction from the rebound chamber 24 to the compression chamber, 26 insofar as the first electronic valve 40 is concerned, and as a valve allowing oil flow only in the direction from the compression chamber 26 to the reservoir chamber 20, insofar as the second electronic valve 42 is concerned), since during the compression phase there is no need for the oil flowing from the compression chamber 26 to the rebound chamber 24 to pass through the first electronic valve 40, while during the rebound phase there is no need for the oil flowing from the reservoir chamber 20 to the compression chamber 26 to pass through the second electronic valve 42.

The advantages obtained by a variable-damping hydraulic shock-absorber according to the present invention are evident from the above description.

First of all, the shock-absorber according to the present invention allows to control the rebound phase and the compression phase independently of each other, due to the fact that it is provided with two electronic valves, one electronic valve controlling the rebound phase (the first electronic valve 40, in the present case), and the other electronic valve controlling the compression phase (the second electronic valve 42, in the present case). In particular, having two electronic valves allows a better control of the high frequencies typical of the movements of the vehicle wheels (approximately 15 Hz): the response of the shock-absorber will be, in fact, very fast, since it will be possible to set each of the two electronic valves in advance, for example, before the beginning of the respective rebound or compression phase.

Moreover, a shock-absorber according to the present invention has smaller sizes than shock-absorbers known from prior art, given that only one of the two electronic valves is arranged outside the body of the shock-absorber and that in the present configuration there is no need to use an annular non-return valve to allow oil flow from the reservoir chamber to the rebound chamber during the compression phase. This makes it possible to use the shock-absorber even in applications with reduced available space, where a traditional shock-absorber cannot be used due to its large sizes.

Another advantage over the prior art is that the present invention only requires passive valves based on standard configurations, since the annular non-return valve used in the prior art to allow oil flow from the reservoir chamber to the rebound chamber during the compression phase is not required herein.

Finally, a further advantage over the prior art is a reduction in unsprung masses (i.e. in the masses that move along with the vehicle wheels), since only one electronic valve is mounted on the body of the shock-absorber, and is thus an unsprung mass (the other electronic valve, being mounted on the rod is a sprung mass), and since the shock-absorber comprises one intermediate cylindrical tube only, instead of two intermediate cylindrical tubes, as in known shock-absorbers. As is known, a reduction in unsprung masses allows improving dynamic behaviour of the vehicle.

The principle of the invention remaining unchanged, embodiments and constructional details may be modified with respect to those described herein purely by way of non-limiting example, without thereby departing from the scope of protection as described and claimed herein.

The invention claimed is:

1. A variable-damping hydraulic shock-absorber, comprising a cylindrical body extending along a longitudinal axis and a rod partially protruding from the cylindrical body and axially movable relative to the cylindrical body,
    wherein the cylindrical body comprises an inner cylindrical tube and an outer cylindrical tube which enclose a reservoir chamber containing a damping fluid,
    wherein the variable-damping hydraulic shock-absorber further comprises a piston which is slidably mounted in the inner cylindrical tube, is attached to a bottom end of the rod and divides the internal volume of the inner cylindrical tube into a rebound chamber and a compression chamber, the rebound chamber and the compression chamber being both filled with the damping fluid,
    wherein the cylindrical body further comprises an intermediate cylindrical tube arranged around the inner cylindrical tube and enclosing along with the inner cylindrical tube an intermediate chamber, said intermediate chamber being permanently in fluid communication with the compression chamber,
    wherein the variable-damping hydraulic shock-absorber further comprises a first electronically-controlled valve and a second electronically-controlled valve to adjust flow of the damping fluid between the rebound chamber and the compression chamber, and between the compression chamber and the reservoir chamber, during a rebound phase and a compression phase, respectively, and wherein said second electronically-controlled valve is arranged outside the cylindrical body of the variable-damping hydraulic shock-absorber and is hydraulically connected on the one hand to the reservoir chamber and on the other hand to the intermediate chamber to adjust, during the compression phase, the flow of the damping fluid from the compression chamber to the reservoir chamber via the intermediate chamber, and
    wherein said first electronically-controlled valve is arranged inside the cylindrical body of the variable-damping hydraulic shock-absorber, namely inside the inner cylindrical tube, so as to be drivingly connected to the rod for translation along the longitudinal axis, and hydraulically connected on the one hand to the rebound chamber and on the other hand to the compression chamber to adjust, during the rebound phase, the flow of the damping fluid from the rebound chamber to the compression chamber.

2. The variable-damping hydraulic shock-absorber as set forth in claim 1, wherein said first electronically-controlled valve is a continuously-controlled proportional valve or an ON/OFF valve.

3. The variable-damping hydraulic shock-absorber as set forth in claim 1, wherein said second electronically-controlled valve is a continuously-controlled proportional valve or an ON/OFF valve.

4. The variable-damping hydraulic shock-absorber as set forth in claim 1, wherein the piston is provided with a first valve assembly comprising a pair of first non-return valves, namely a compensation valve, which allows the flow of the damping fluid only in direction from the compression chamber to the rebound chamber, and a rebound valve, which allows the flow of the damping fluid only in direction from the rebound chamber to the compression chamber, and wherein a second valve assembly is mounted on a bottom of the inner cylindrical tube and comprises a pair of second non-return valves, namely a compression valve, which allows the flow of the damping fluid only in direction from the compression chamber to the reservoir chamber, and an intake valve, which allows the flow of the damping fluid only in direction from the reservoir chamber to the compression chamber, said first and second non-return valves being passive valves.

5. The variable-damping hydraulic shock-absorber as set forth in claim 4, wherein the intake valve is configured to remain open during the entire rebound phase, whereby during said rebound phase the flow of the damping fluid from the reservoir chamber to the compression chamber takes place only through the intake valve, rather than through said second electronically-controlled valve.

6. The variable-damping hydraulic shock-absorber as set forth in claim 4, wherein the compensation valve is configured to remain open during the entire compression phase, whereby during said compression phase the flow of the damping fluid from the compression chamber to the rebound chamber takes place only through the compensation valve, rather than through said first electronically-controlled valve.

* * * * *